Nov. 24, 1964   H. NARAGHI   3,158,401
APPARATUS FOR BULK HANDLING OF PRODUCE AND THE LIKE
Filed June 13, 1960
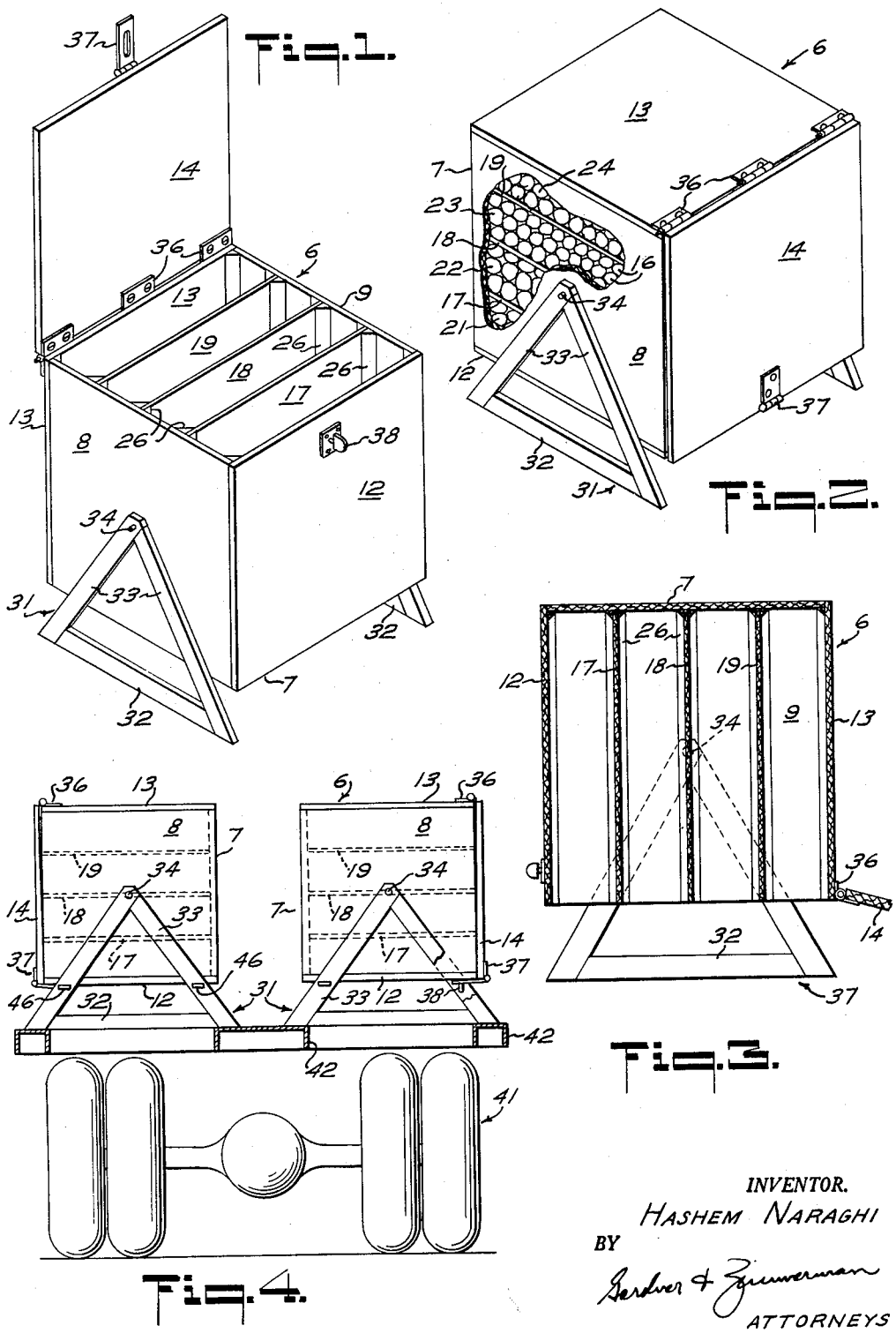
INVENTOR.
HASHEM NARAGHI
BY
 Gardner & Zimmerman
ATTORNEYS

United States Patent Office 3,158,401
Patented Nov. 24, 1964

3,158,401
APPARATUS FOR BULK HANDLING OF
PRODUCE AND THE LIKE
Hashem Naraghi, Rte. 2, Box 750, Escalon, Calif.
Filed June 13, 1960, Ser. No. 35,505
2 Claims. (Cl. 298—8)

This invention generally relates to the art of handling relatively crushable articles such as fresh fruit or the like between the time the same has been picked and the time of delivery to a cannery or other processing or distribution point.

In accordance with conventional operations, particularly in the handling of freshly picked fruits and vegetables, such as apricots, peaches, tomatoes and the like, the articles are placed into so-called lug boxes which usually have a capacity of approximately 50 pounds. The filled lug boxes are then stacked on a pallet, the loaded pallets placed on a truck, and the truck delivers the same to the cannery or the like. At the cannery, considerable difficulty is encountered since the boxes must be removed from the pallets, inverted so as to dump the product therefrom, and then restacked on the pallets for delivery back to the farm or orchard for refilling.

Not only is the foregoing type of operation cumbersome, uneconomical, and time consuming, but a further disadvantage arises from the abuses to which the lug boxes are subjected in connection therewith, and it is not uncommon for individual boxes to be completely rebuilt several times during the course of a single season.

As a result of the above, it has been suggested to transport the produce in bulk containers, since this would result in the elimination of many of the difficulties and shortcomings hereinabove discussed. This, however, produced other difficulties. First, a large bin or container is unwieldy to handle, thereby creating problems in the mere physical handling of the unit. Next, and more important, it was found that if the container was of sufficient size to fulfil its requisite functions, the lowermost articles in the container would be crushed and damaged by the time the articles were removed. It was interesting to note that the amount of damage is substantially directly correlated to the amount of time the articles remained in position. In other words, for relatively short periods of time, no crushing occurred even with a product depth of some four feet. However, after a couple of hours, or the minimum time required to get the product to a cannery, the bulk of the product would be damaged to an extent varying with its position in the container.

It is accordingly an object of the present invention to provide a method and apparatus for the packing and transporting of crushable products on which the product may be placed and maintained in a large bulk container having a depth at which the product would normally be damaged due to the weight of the superimposed product, yet which permits the product to remain in the container over extended periods of time without product damage.

Another object of this invention is to provide a method of the type described in which the product is initially deposited in a container to a depth at which damage to the lower products would occur over a period of time, and then causing the product to be shifted in such a manner that the maximum product depth is less than that at which such damage would occur.

A further object of the invention is to provide apparatus as above described which includes a bulk storage bin in which a plurality of partition members are provided normally extending vertically and between which the product is placed, whereby upon rotating the bin until the partitions are horizontally disposed, the maximum unsupported depth of the product will correspond to the partition spacing.

Yet another object of this invention is to provide apparatus of the type referred to in which means are provided for facilitating movement of the box between a loading position, a transporting or storage position, and a dumping position.

A still further object of the invention is to provide apparatus of the character described which may be readily incorporated on a vehicle so as to further increase its value in the handling and transporting of the product.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a front perspective view of a bulk transport box constructed in accordance with the teachings of this invention, and shown in its loading position.

FIGURE 2 is a similar view of the box, but showing the position of the parts during transportation or storage.

FIGURE 3 is a transverse cross-sectional view of the box illustrating its position during the product dumping operation.

FIGURE 4 is an end view of a wheeled vehicle equipped with a pair of said boxes.

Before discussing the details of the present invention, reference is made to the term "maximum storage safe depth." This expression is defined herein as the depth to which a product may be stacked over substantial periods of time without resulting in crushing of the lowermost articles in the stack. Conversely, the term "maximum short term safe depth" may be defined as the depth to which a product may be initially stacked for relatively short periods of time, e.g. one hour, without deleterious results. By way of example, considering easily bruised or crushed articles such as tomatoes, the maximum storage safe depth is in the neighborhood of one foot, while the maximum short term safe depth may approximate four feet.

It is thus contemplated by the present invention to initially conveniently receive the articles until the maximum short term safe depth is reached. Then, the articles are bodily shifted until they are disposed at their maximum safe depth.

Apparatus capable of carrying out the foregoing is disclosed in the drawing and reference is now particularly made to FIGURE 1 wherein a bulk storage and transport box 6 is disclosed. The box 6 includes a bottom 7, opposed side walls 8 and 9, a front wall 12, and a rear wall 13. The box has an open top which may be selectively closed by means of a cover 14. For convenience in handling and operation, and maximum carrying capacity without exceeding the maximum short term safe depth, the box is in the form of a cube, and where freshly picked fruit and vegetables are to be placed therein, the length, width and depth of the box may each be four feet. Thus, insofar as the maximum short term safe depth is concerned, the box could be filled with product, such as the fruit or vegetables 16 without resulting in damage thereto. If the filled box could be immediately brought to the unloading zone, a bulk box as above described would be generally adequate. However, since in practically all cases, too long a period of time elapses between placing the product into the box and then removing it therefrom, the maximum safe depth is thereby exceeded.

In view of the foregoing, means are provided to change the maximum short term safe depth to the reduced maximum safe depth. As herein illustrated, such means include a plurality of partitions, here shown as three in number and designated by the numerals 17, 18 and 19 respectively. These partitions are disposed in parallel relation between the walls 12 and 13 and extend completely across the box to join with the side walls 8 and 9, and likewise extend from the bottom wall 7 to terminate at the open end of the box. The partitions are equally spaced relative to each other and to the parallel walls 12 and 13 so as to define four equal chambers 21, 22, 23 and 24, each having a four foot depth, and a four foot by one foot cross-sectional extent when the box is in the upright loading position shown in FIGURE 1.

The partitions may be secured in the box in any suitable manner and braced as shown at 26, and will not interfere with the normal loading of the product through the open top of the box into the chambers 21 to 24. Thus, when the box is filled, there will actually be four separated stacks of product, each at its maximum short term safe depth.

After filling, the cover 14 is closed and the box rotated through ninety degrees until the partitions assume a horizontal disposition as shown in FIGURE 2. Since the partition spacing is predetermined, the product in each chamber will have a depth corresponding to or less than the maximum safe depth, and accordingly the box may be transported in such position, or even stored, for considerable periods of time without product damage.

From the storage or transport position just described, a further ninety degree rotation of the box to the position shown in FIGURE 3, will again place the partitions in vertical position, but with the cover 14 lowermost. Hence, opening of the cover will permit the product 16 to gravitally fall from the chambers and be dumped into a water tank, onto a take-away conveyor, or any other handling apparatus.

To facilitate the aforementioned rotation of the box, the latter may be pivotally mounted on supporting brackets 31. Brackets 31 are disposed adjacent the opposed side walls 8 and 9 and include a ground engaging base 32 and frame members 33 extending upwardly therefrom. The frame members at their upper end portions are journalled on a pin 34 carried by the side walls at the center of gravity of the box. Sufficient clearance is provided between the base 32 and box bottom 7 to permit the aforementioned box rotation in the frames. If desired, additional props could be placed under the box in the loading or storage positions thereof.

The cover 14 may be hingedly connected to rear walls 13 as shown at 36 and the front end of the cover provided with latch means 37 adapted to engage with cooperating latch means 38 on the front wall when the cover is closed in order to releasably retain the cover in closed position.

In FIGURE 4, a pair of boxes 6 are shown mounted on a wheeled transport vehicle 41 having an upper deck of transversely spaced structural elements 42 on which the frames 31 are mounted. The two boxes are placed in back to back spaced relationship and function in the manner previously described. It is significant to note that in this embodiment, the product may be dumped from the boxes between the elements 42 of the truck, such as when the truck straddles a conveyor or the like at a cannery. When the boxes are not mounted on a truck, the spacing of the bottom wall from the ground facilitates the use of a fork lift to move the same.

Preferably, additional means are provided to prevent accidental box rotation, such as by inserting a pair of stop pins 46 through openings in the frame so as to engage the then lowermost wall of the box in spaced locations.

From the foregoing, it will be readily understood that while the method and apparatus above described is extremely simple in operation and construction, a material advance is made in the bulk handling of articles without damage thereto.

What is claimed is:

1. A bulk storage and transport unit including a wheeled vehicle having a plurality of spaced longitudinally extending structural elements defining the vehicle body with the space therebetween being generally open, a bin supporting frame mounted on said elements, a bin pivotally mounted on said frame for rotation about a generally horizontal axis, said bin having a bottom wall, end walls, side walls and an open top, a removable closure for said top, and a plurality of spaced partitions extending generally parallel to said end walls, the space between adjacent partitions being substantially less than the normal height of said bin, said partitions being parallel to said axis of rotation whereby said bin may be filled through said open top, transported with said partitions in horizontal position, and dumped by completely inverting the same.

2. Apparatus as set forth in claim 1 in which a pair of bins are provided in transverse side by side relation and are mounted for contra rotation in moving from filling to transport to dumping position.

References Cited by the Examiner
UNITED STATES PATENTS

| | | | |
|---|---|---|---|
| 310,091 | 12/84 | Smith | 220—22 |
| 895,209 | 8/08 | Smith | 220—22 X |
| 2,196,689 | 4/40 | Wolf | 220—22 |
| 2,456,630 | 12/48 | Gibler. | |
| 2,672,247 | 3/54 | Jewett | 214—314 |
| 2,702,943 | 3/55 | Persson. | |
| 2,711,050 | 6/55 | McIntyre | 220—22 |
| 2,711,838 | 6/55 | Avery | 214—314 |
| 2,848,292 | 8/58 | Lewis | 220—22 |
| 2,922,517 | 1/60 | Nordquist et al. | |
| 2,944,688 | 7/60 | Jeremiah | 214—152 |
| 2,948,424 | 8/60 | Corrigan | 214—152 |
| 3,067,890 | 12/62 | Veyrie | 214—300 |

HUGO O. SCHULZ, *Primary Examiner.*

MORRIS TEMIN, GERALD M. FORLENZA,
*Examiners.*